(12) United States Patent
Axelsson et al.

(10) Patent No.: US 7,660,287 B2
(45) Date of Patent: Feb. 9, 2010

(54) METHOD, COMMUNICATION DEVICE AND SYSTEM FOR ADDRESS RESOLUTION MAPPING IN A WIRELESS MULTIHOP AD HOC NETWORK

(75) Inventors: Leif Axelsson, Hovås (SE); Anders Lundström, Kalmar (SE); Magnus Westbergh, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 11/547,604

(22) PCT Filed: Apr. 5, 2004

(86) PCT No.: PCT/SE2004/000537

§ 371 (c)(1),
(2), (4) Date: Oct. 4, 2006

(87) PCT Pub. No.: WO2005/099222

PCT Pub. Date: Oct. 20, 2005

(65) Prior Publication Data

US 2008/0137580 A1    Jun. 12, 2008

(51) Int. Cl.
*H04W 4/00* (2006.01)
(52) U.S. Cl. ............................ 370/338; 370/395.54
(58) Field of Classification Search ............... 370/338, 370/254
See application file for complete search history.

(56) References Cited

U.S. PATENT DOCUMENTS

| | | | |
|---|---|---|---|
| 6,307,843 B1 * | 10/2001 | Okanoue | 370/312 |
| 6,580,981 B1 | 6/2003 | Masood et al. | |
| 6,704,293 B1 * | 3/2004 | Larsson et al. | 370/255 |
| 6,990,080 B2 * | 1/2006 | Bahl et al. | 370/254 |
| 7,352,726 B2 * | 4/2008 | Fujisawa | 370/338 |
| 2002/0013856 A1 * | 1/2002 | Garcia-Luna-Aceves et al. | 709/238 |
| 2002/0071395 A1 | 6/2002 | Redi et al. | |
| 2002/0142721 A1 * | 10/2002 | Souissi et al. | 455/41 |
| 2003/0063607 A1 | 4/2003 | Adachi et al. | |
| 2003/0072306 A1 | 4/2003 | Hunzinger | |
| 2003/0202524 A1 | 10/2003 | Conner et al. | |

FOREIGN PATENT DOCUMENTS

WO    03/021817 A1    3/2003

OTHER PUBLICATIONS

International Search Report of PCT/SE2004/000537, mailed Nov. 16, 2004.

* cited by examiner

*Primary Examiner*—Vincent P Harper
*Assistant Examiner*—Natasha Cosme
(74) *Attorney, Agent, or Firm*—Nixon & Vanderhye P.C.

(57) ABSTRACT

A method is presented for address resolution mapping in a wireless multihop communication network wherein the network is built up by client devices and/or infrastructure devices, network traffic is based on using ARP forwarding and rebroadcasting to locate devices in such a network architecture. The invention also includes devices for such a network and the complete communication system is described.

30 Claims, 4 Drawing Sheets

| Hardware Type |  |
|---|---|
| Protocol Type |  |
| Hardware Address Len | Protocol Address Len |
| Operation Code |  |
| Sender Hardware Address |  |
| Sender IP Address |  |
| Recipient Hardware Address |  |
| Recipient IP Address |  |

*Fig.3*

METHOD, COMMUNICATION DEVICE AND SYSTEM FOR ADDRESS RESOLUTION MAPPING IN A WIRELESS MULTIHOP AD HOC NETWORK

This application is the US national phase of international application PCT/SE2004/000537, filed 5 Apr. 2004, which designated the U.S., the entire content of which is hereby incorporated by reference.

FIELD

The present disclosure relates to a communication network, specialty a computer network in an ad hoc network, and in particular a packet based routing scheme using additional Address Resolution Protocol (ARP) message types.

BACKGROUND

Wireless communication between mobile users is becoming more and more popular as devices and technology is developed. The infrastructure roll out is expanding within both telecom systems and data network systems. Today also the telecom systems are increasingly using packet switched networks and the trend is clear towards this scheme of packet based routing. This system has been used for many years in the data networks and thus many standardized routing protocols exist for this purpose. However, they are not prepared for rapidly changing network topographies like for instance so called ad hoc networks.

Wireless ad hoc networks are characterized in that they do not have the same static nature as an ordinary wired network infrastructure, the ad hoc based network do not have a centralized control and is often created in a spontaneous manner. It maintains control through a decentralized concept. Nodes can be connected or disconnected in an uncontrolled manner as compared to standard fixed network architectures; the nodes may come and go quickly which leads to a dynamically changing network topology. In some cases such ad hoc networks are formed by user/client devices themselves as infrastructure components. These components are then truly mobile in the sense that the users move around, in and out of a network cell, and therefore the infrastructure will move around and change dynamically accordingly. This is an exciting and promising way of building an infrastructure; however, it sets very high demands on the routing protocol.

Other problems in a wireless environment are due to radio specific questions that will degrade the performance and efficiency of the network flow. There may be fading problems due to the movement of infrastructure nodes or movement of objects in the radio environment, and there may be problems due to interference from other radio sources within range.

These kinds of network topographies have been used in the military environment but are now migrating into the civilian area as well. Wireless systems are now used to rapidly build infrastructure areas for, e.g. wireless broadband access in residential areas or commercial areas. It may be used for temporary infrastructure build up, for example in an emergency situation, in a disaster area, or on the battlefield for military purposes. It could also be used to build up temporary access coverage areas during events like, for example, concerts, conferences, meetings, or seasonal tourist areas. In these kinds of areas, it is not necessary to have coverage all year around but only during specific periods, thus a fixed infrastructure build up in such a case may prove to be too expensive.

Today, several Internet Service Providers (ISP) offer wireless access at public or semi-public areas such as airports, restaurants, coffee shops, and hotels using fixed wireless infrastructure systems. These systems are often referred to as so called hotspots.

As the demand from the users to gain access increases considering coverage and bandwidth, one way of expanding the area of wireless coverage or bandwidth is to install more infrastructure components, however doing this with normal fixed wireless components are expensive and thus the idea to build networks using wireless routers has emerged. In this case ad hoc routing protocols may be used to have a simplified installation procedure.

There are basically two kinds of network usages when discussing ad hoc networks; the first one is the build up of a local area network without any external gateway providing access to an external network, for example Internet. This scheme may be found in installations concerning disaster areas or military installations on the battlefield. The other and probably more common usage is when one or several gateways provide the network with external connections to, for example, an IP (Internet Protocol) based network, private or public, e.g. Internet. In such a network configuration, data packets may take different routes and/or use different gateways depending on, for example, the data traffic type, congestions, or routing cost.

Packet based routing schemes often build their communication network systems around a layered model, for instance the OSI reference model. The communication software or hardware is divided into several smaller sub units, layers, working in a hierarchical manner. Information and communication control parameters are passed up and down locally and between the same layers between the sending and receiving ends. Each such layer is responsible for different tasks in the communication order. In respect to routing the first three layers according to the OSI reference model are the most important.

Layer 1 is responsible for the physical transmission of bits of data; examples of physical means may be, for instance, the wired link in an Ethernet based network or a wireless link in a Wireless Local Area Network (WLAN).

Layer 2 is often called the Link layer or the MAC layer and is responsible of transmitting chunks of data, error detection, and network resource coordination.

Layer 3 is often called the Network layer; it is responsible for enabling communication between any pair of nodes in a network. This layer takes, for example, care of routing calculations and some congestion control. For this purpose different routing protocols has been developed depending on the type of network.

Packet routing protocols in the IP-based networks are generally based on routing algorithms using distance vector or link state information to find and maintain a route for each pair of source and destination nodes in the network. In principle, in the distance vector routing algorithms, each router broadcasts the distance to all hosts to its neighbor routers, and each router receiving the information calculates the shortest route to each of the hosts in the network. In the link-state routing algorithms, each router broadcasts the status information of each of its adjacent network links to its neighbor routers, and each router receiving the information maintains the database of the entire picture of the network from the link status information and calculates the shortest route to each host based on the link costs in the database. These routing algorithms are designed for relatively static networks and thus new routing algorithms must be designed for ad hoc networks whose topology changes frequently.

There are basically two categories of existing routing protocols for ad hoc networks. These are "proactive" (table driven) and "reactive" (on-demand) routing protocols. Protocols having combinations of these protocols are also possible.

Proactive routing protocols constantly and periodically calculate a route to all hosts in the ad hoc network, and thus a route is always available when a packet needs to be sent to a particular destination host. The results are kept in routing tables in all nodes.

In order to maintain routes to each host, control messages are exchanged among the routers to notify changes of the network configuration and link status. Distance vector and link state routing protocols are both categorized as proactive protocols. It should be noted that control messages lead to overhead and may result in reduced network efficiency. Also, the proactive protocols may have difficulty in maintaining valid routes when the network topology changes frequently.

DSDV (Destination-Sequenced Distance Vector Routing) is a proactive routing protocol based on the distance vector algorithm, adapting the Routing Information Protocol (RIP) to ad hoc networks. Each node maintains a routing table in which the node stores the next hop node and hop count to each of all the reachable destination hosts. In DSDV, each node broadcasts or multicasts routing updates periodically, or when it detects changes of the network topology. Incremental updates, which update only information about changes since the last update, are also used in order to reduce control traffic.

A reactive protocol only performs control message exchange to find/update a route when there is a data packet to be sent. When a source node wants to send data packets, it initiates the control protocol to find a route by sending a route request message to its neighbor nodes. By this principle, the reactive approach is good in that network resources are not wasted when there are no packets to be transported. However, it takes longer time to send packets when a route has to be formed for the first time. AODV and DSR are representative reactive protocols.

AODV (Ad hoc On-Demand Distance Vector Routing) protocol uses the DSDV algorithm and creates/updates routes on an on-demand basis, that is, only when a source node wants to send a data packet. This leads to reduction of the number of required broadcasts for finding/updating a route.

In AODV, each node maintains a list of detected neighbor nodes. The neighbor list is updated in one of the following three ways: a) when a packet is received from the neighbor node, b) by receiving local advertisement, that is, hello message, from the neighbor node, or c) through feedback from the link layer. Hello messages are broadcasted periodically from each node to its neighboring nodes to inform them about its presence.

In AODV, each node maintains a routing table for all the destinations, each of which the node is either communicating with or forwarding data packets to on behalf of other nodes. For each destination, there is an entry in the routing table that contains information about the destination, such as the IP address, the sequence number for the destination node, hop count to the destination, the next hop node to the destination, and lifetime for the route.

When a node wants to communicate with a destination node, that is, to send data packets to the destination, then the source node initiates a route discovery mechanism, where the source node broadcasts a route request (RREQ) to all detected neighbor nodes. When the neighbor node receives the RREQ message and has the entry for a fresh enough route to that destination in its routing table, then it sends back a route reply (RREP) message to the source node. If the neighbor node does not find a route entry for that destination, then it forwards the RREQ message to its own detected neighbor nodes. When the destination node receives the RREQ, it returns the RREP message to the source node.

In the process of forwarding the RREQ packet, each intermediate node records the IP address of the neighbor node from which the first copy of the broadcast RREQ is received, by which a reverse route is established. The copies of the same RREQ messages received later are all discarded. The intermediate nodes add an entry to their routing table for the destination, where the neighbor node from which the RREP was received is recorded as the next hop node for that destination. The destination sequence number and lifetime of the route are copied from the RREP and recorded in the entry. When the RREP message is returned to the source node finally, a forward route from the source to destination is formed.

When a node detects that a route becomes unavailable by failure of the incident link on the route, it sends a route error (RERR) message to all the neighbor nodes, which use the route. The RERR message is sent on to their neighbor nodes and so on until it reaches the source node. The source node can then decide to either stop sending data packets or initiate a new route discovery.

DSR (Dynamic Source Routing) protocol uses a source routing mechanism in which the source node determines the complete sequence of nodes along the route on an on-demand basis and sets the list of the intermediate nodes in the packet header to indicate the sequence of nodes for the route. In this way, each packet has to carry the overhead for packet routing. However, the intermediate nodes do not need to maintain any information about the route and they can learn routes when delivering data packets.

In DSR, each node stores (caches) the routes it has learned. When a source node wants to send data packets to a destination node and has no entry in the cache for that destination, then it initiates a route discovery mechanism by broadcasting a RREQ message on its link-layer. Each node receiving the RREQ message appends their IP addresses to the RREQ message and then forwards it further. This process is done until the route to the destination is found or another node can provide a route to the destination node. Then a route reply (RREP) message containing the sequence of network hops to the destination node is returned to the source node.

In DSR, when a link failure is detected at a node (i.e. when the packet has been retransmitted a maximum number of times), that node removes the link from its routes cache and sends a route error (RERR) message to each of the nodes that have used that link since an acknowledgement was last received. Those nodes have to remove the routes including that link. The retransmission of the data packet from the source node is then handled by upper layers such as the Transmission Control Protocol (TCP).

One problem with the TCP/IP protocol is that it only makes use of IP addresses and in a data link in an Ethernet or token ring example, the network components has its own addressing scheme to which any network layer using the data link must conform. In, for example, an Ethernet several different network layers can cooperate at the same time, several network applications can use the same physical cable. When an Ethernet frame or packet is sent from one location to another it uses a 48 bit Ethernet address for determining the destination and source of the packet. A unique 48 bit Ethernet address is found in all Ethernet networking hardware and often called the MAC address (Media Access Control). This 48 bit address can be compared with the 32 bit IP address used in IPv4 (Internet Protocol version 4). Address resolution provides the mapping scheme between the two different forms of addresses. This mapping is done by the ARP (Address Resolution Protocol). ARP provides the mechanism to dynamically map hardware MAC addresses to IP addresses in a temporary memory space called the ARP cache. In other words the ARP translates the IP address to a MAC address.

The basic operation of ARP is as follows: when the IP layer wants to communicate with another device on the network, it checks the ARP cache (to see if there is a match with an Ethernet address). If there is no matching entry in the ARP cache, an ARP broadcast datagram is sent out that basically says: "The device with this IP address, reply with your Ethernet address?". The receiving station (that has the IP address) responds with an ARP datagram that says: "This is my IP address and here is my Ethernet address", The ARP cache is updated and the original IP layer information is passed on to the MAC layer for processing.

This scheme work fine for fixed line networks, but in wireless ad hoc and/or multihop networks not all network units can hear each other, in this case the standard ARP solution will not suffice. For this purpose some different layer 2.5 solutions for mapping IP and MAC addresses have been developed.

There are mainly two different routing protocols working as intermediary between layer 2 and 3, so called layer 2.5 protocols:

1. Lightweight Underlay Network (LUNAR). Instead of utilizing pure ARP, the ARP traffic is trapped by the Translating Underlay Network (SelNet) and rewritten to the extensible Resolution Protocol (XRP). XRP permits a much richer set of expressions than standard ARP. To maintain routes in LUNAR, all routes are cleared every third second and the path discovery procedure is redone.
2. Layer two DSR (the original version. In the route discovery process the packets used for routing is similar to ARP, but all addresses of the nodes along are recorded. As the protocol is a source routing protocol the whole route will also be added to every header of the data packets. The number of such addresses is limited and thereby results in a limited number of hops. The route maintenance is operating by detecting acknowledgements (ack.) hop by hop for each data packet transmitted. When no acknowledgement is achieved, the packet is retransmitted a certain number of times until the link is considered broken and another route is searched for.

The problems with the above mentioned solutions can be summarized as follows:

1. Standard ARP can only be used for local peer-to-peer communication in a wireless network.
2. Packets in the network are normally not reused in ad hoc routing protocols.
3. LUNAR protocol is limited to a maximum of 10-15 nodes in total in a network cell and a maximum of 3 hops. In order to keep updated mapping tables it floods the network often, which results in additional control traffic. Also, it utilizes an external additional protocol to enable multihop functionality.
4. DSR on layer 2 is limited to a certain number of hops since all network addresses are stored in all packets (both data and control traffic packets). This solution demands additional resources and a new ARP like protocol is introduced.

Accordingly the above mentioned solutions will not be transparent in a standard IP based network and will take up extra resources both from the available network resources and from the computing power of the involved routing components.

SUMMARY

Thus, it is one object of one or more non-limiting embodiments of the present invention to remedy at least some of the above mentioned problems and drawbacks.

In one non-limiting aspect, this is done by introducing new features in the ARP messages without changing the ARP message structure. In this way, network components using standard ARP functionality will not be affected by this new ARP message structure. However, network components using an ARP solution with the new features will be able to make use of an efficient ARP mapping.

In one preferred embodiment, a non-limiting method for "address resolution mapping" is provided for a wireless multihop data communication network, the method comprising the steps of: broadcasting an address resolution protocol (ARP) request from a first network node to a second node or nodes; the second node receiving the ARP request determining the destination of the ARP message; transmitting the ARP request if the ARP request is determined to be destined to a third node; and forwarding ARP replies from a destination network node to the first network node via intermediary network node or nodes.

The method further comprises a pending list of stored detected previous ARP requests and ARP forwards in the nodes.

The method may further comprises the steps of limiting the storage time in the pending list of the stored previous ARP requests or forwards, limiting the rate of ARP forwards a node are allowed to send to a specific destination, measuring link quality between nodes and distributing link quality information to nodes during ARP message procedures, using the link quality information to determine when the ARP table should be updated, comparing the link quality information with a threshold value in order to determine if an update is to be done, and modifying the ARP request prior to rebroadcasting or forwarding the ARP request.

According to the method, ARP error message may be generated and distributed to listening nodes in the network when a node can not communicate with a certain node.

In another embodiment, a non-limiting communication device is presented, wherein the device has routing means in a multihop wireless network, and the device comprises: an instruction set memory; at least one wireless transceiver; means for providing address resolution protocol (ARP) instructions in the instruction set memory; and means for providing ARP message forwarding and rebroadcasting instructions in the instruction set memory.

In the device, the means for ARP forwarding and broadcasting may include means for determining the destination of an ARP message.

The device may be a client system, such as, but not limited to, laptop, personal computer (PC), personal digital assistant (PDA), mobile phone, or embedded computer or infrastructure system, such as, but not limited to, WLAN (Wireless Local Area Network) infrastructure devices, and mobile phone infrastructure devices.

The ARP forwarding or rebroadcasting instructions may modify the ARP message to appear to originate from the device modifying the message.

In yet another embodiment, a non-limiting system for multihop wireless data communication is presented, the system comprises: a plurality of communication devices; the communication devices comprising: an instruction set memory; at least one wireless transceiver; means for providing address resolution protocol (ARP) instructions in the instruction set memory; and means for providing ARP forwarding and rebroadcasting instructions in the instruction set memory; and a communication network built up by the communication devices.

The communication device in the data communication system further comprises means for determining the destination of the ARP message.

The communication device may be a client system, infrastructure system, or a combination of these two types of devices. Examples of client system may be, but not limited to, a laptop, personal computer (PC), personal digital assistant (PDA), mobile phone, or embedded computer. Examples of infrastructure systems may be, but not limited to, a WLAN (Wireless Local Area Network) infrastructure devices, and mobile phone infrastructure devices.

The system may further comprise at least one gateway connected to an external network, such as Internet or a private IP network.

The disclosure also relates to an instruction set for "address resolution mapping" in a wireless multihop data communication network, the instruction set comprises: a first instruction set for broadcasting an address resolution protocol (ARP) request from a first network node to a second node; a second instruction set in the second node for receiving the ARP request determining the destination of the ARP message; a third instruction set transmitting the ARP request if the ARP request is determined to be destined to a third node; and a fourth instruction set for forwarding ARP replies from a the third node to the first network node via the second node(s).

BRIEF DESCRIPTION OF THE DRAWINGS

In the following the invention will be described in a non-limiting way and in more detail with reference to exemplary embodiments illustrated in the enclosed drawings, in which:

FIG. 3 illustrates a schematic message structure of ARP messages.

DETAILED DESCRIPTION

The present disclosure relates to the concept of mobile ad hoc networks, wherein a self-organizing wireless network of mobile nodes communicates with each other using a so called multihop routing system. The nodes act as both hosts/client systems and routers, i.e. infrastructure devices. Traffic is routed via the nodes and if necessary routed to external gateways having access to an external IP network, e.g. Internet.

In a non-limiting aspect, a new solution for ARP (Address Resolution Protocol) is presented wherein ARP messages are forwarded to recipient nodes using intermediary nodes situated in the path between the ARP requesting node and the final recipient of the ARP message.

Figure 1:
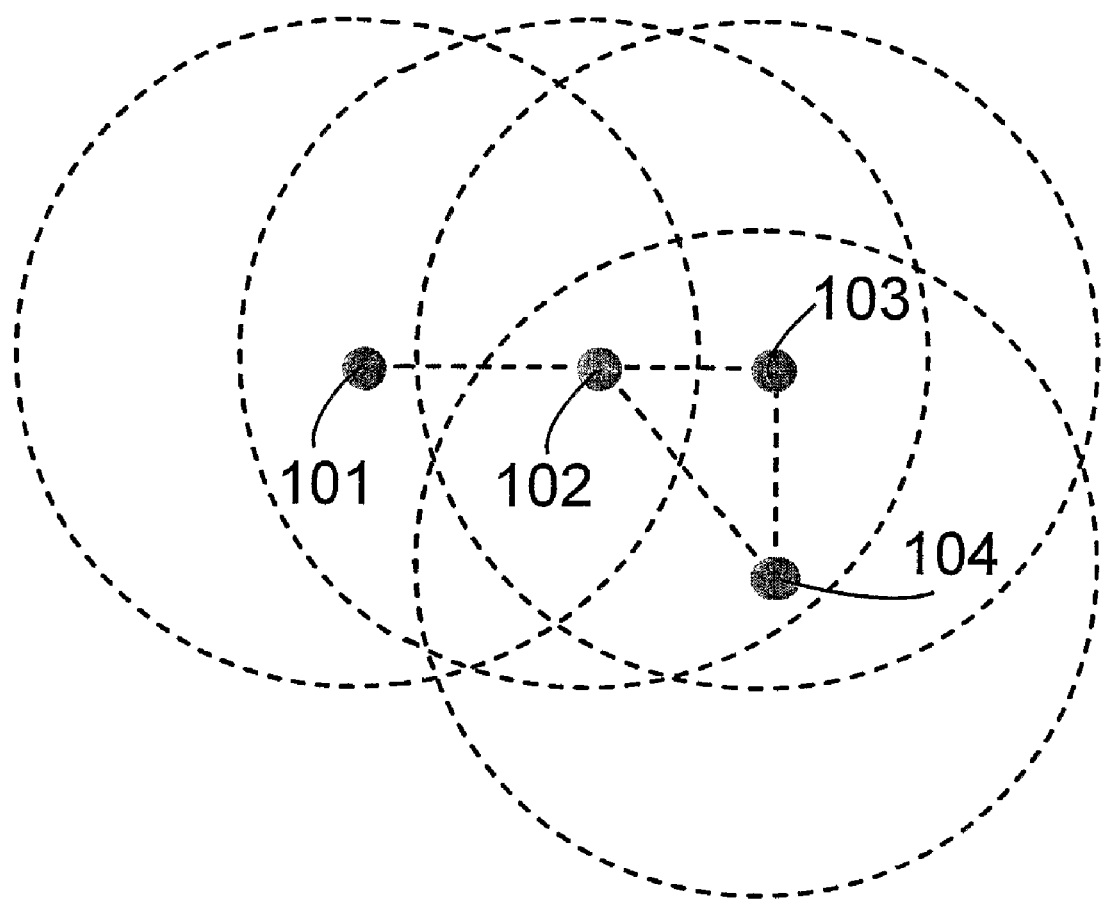
FIG. 1 illustrates in a schematic way a small multihop network.

In FIG. 1 a number of network nodes 101, 102, 103, and 104 are illustrated for a multihop wireless network. The nodes 101, 102, 103, and 104 are in communication with each other, however not all nodes have contact with each other. This means that in some situations some nodes will relay messages and act as routing elements. For instance, if node 101 wants to communicate with node 104 nodes 102 or 102 and 103 need to be involved in the packet transactions since the nodes 101 and 104 can not in this situation directly "hear" each other, i.e. can not directly communicate with each other.

When a message is to be sent from one node to another node the network addresses of the nodes need to be resolved. A new ARP procedure is proposed wherein new ARP messages are added to enable ARP message structure is changed in such a way that ARP forwarding or rebroadcasting. The nodes lying in between two nodes that need to know each others network addresses will forward such ARP requests until the ARP request reaches the sought after destination.

Let us illustrate this with a schematic stepwise procedure assuming node 101 wants to communicate with node 104 according to FIG. 1:

1. Node 101 wants to send data to node 104.
2. Automatically node 101 broadcasts an ARP request: "Who is 104, tell 101?".
3. This message is received by the adjacent node 102, which immediately rebroadcasts the request: "Who is 104, tell 102?".
4. This request is received by the adjacent node 103, which rebroadcasts the request: "Who is 104, tell 103?". However, in this specific case the request is also received by node 104, who replies by sending: "Node 102, I am 104".
5. The request transmitted by node 103 is received by node 104, who replies by sending: "Node 103, I am 104".
6. The reply from node 104 to node 102 is received by node 102.
7. Node 102 replies to the origin of the request (node 101) by sending an ARP forward: "Node 101, use node 102 as gateway to node 104".
8. The reply from node 104 to node 103 is received by node 103. Node 103 replies to node 102 by sending: "Node 102, use node 103 as gateway to node 104".

Figure 2:
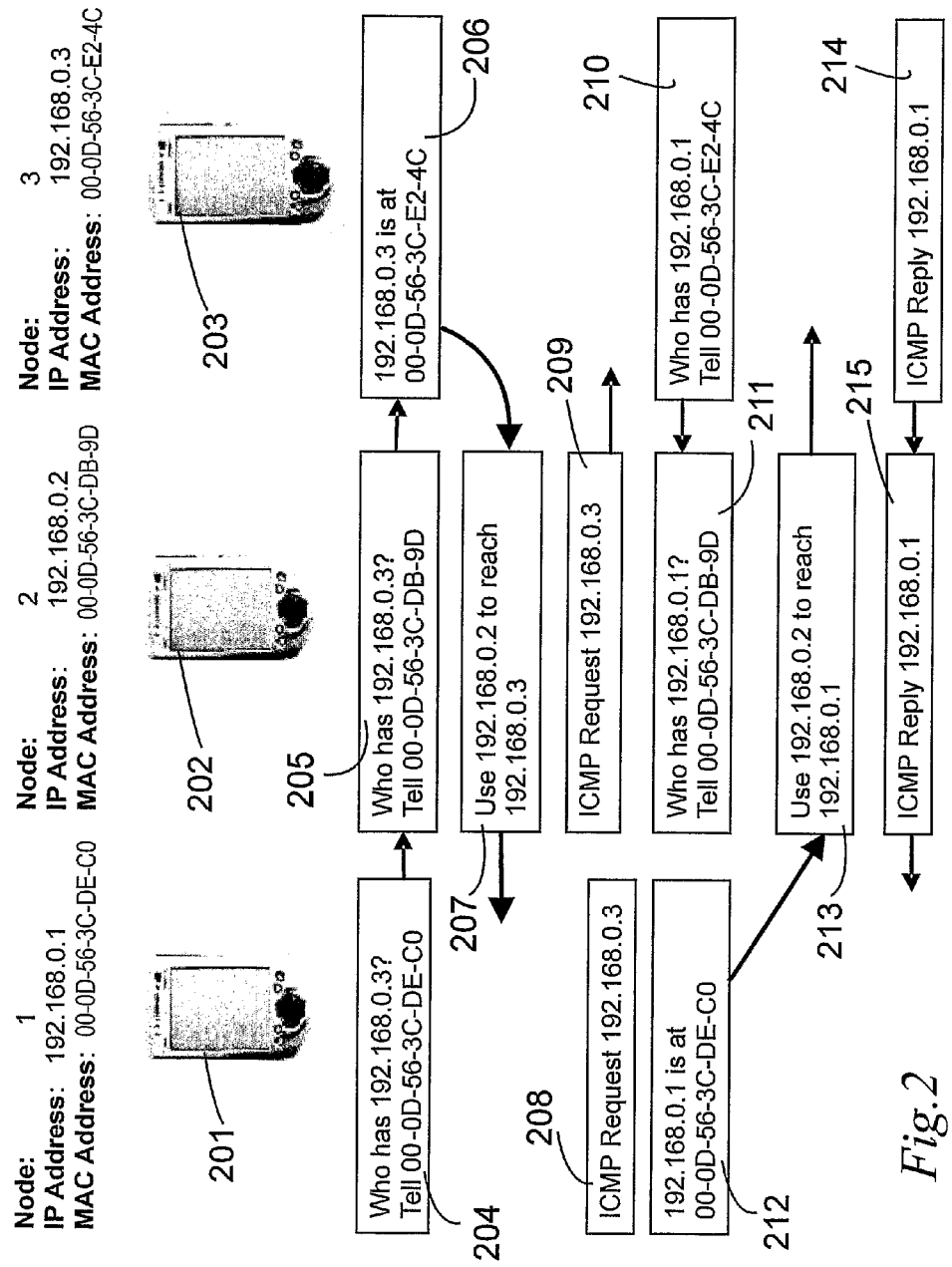
FIG. 2 is a flow diagram over small multihop network with the different communication messages.

In another example as shown in FIG. 2, three nodes (201, 202, 203) are connected in a small network. Node 201 wants to communicate with node 203 but can not do so directly. However, node 202 is positioned in such a way that it can relay messages between node 201 and 203. In FIG. 2 node 201 wants to send an ICMP (Internet Control Message Protocol) echo request, commonly referred to as ping, to node 203. The message boxes 205, 207, 211, and 213 in FIG. 2 indicate the new message types communicated between the nodes according to the non-limiting aspect.

1. When node 201 starts its communication procedure it first sends an ARP message asking for the location of the IP number it wants to communicate with. This is illustrated in box 204.
2. This ARP request is received by node 202. Node 202 determines that the message is meant for another node than itself. The message is altered to appear to come from node 202, and rebroadcasted by node 202 as illustrated in box 205.
3. The message is received by node 203 and an ARP reply is sent to node 202 (box 206) and node 202 forwards the ARP reply to node 201 (box 207).
4. Node 201 then has the coordinates for node 203 and sends the ICMP request to node 203 (box 208) and the ICMP request is relayed by node 202 (box 209).
5. Node 203 receives this ICMP request and then wants to send an ICMP reply. However, it needs to know the MAC address of node 201 in order to send the reply and therefore sends an ARP request for node 201. This is illustrated in box 210.
6. This message is received by node 202. Node 202 determines that the message is meant for another node than itself. The message is altered to appear to come from node 202, and rebroadcasted by node 202 as illustrated by box 211.

7. The message is received by node 201 and an ARP reply is sent to node 202 (box 212) and node 202 forwards the answer to node 203 (box 213).
8. Node 203 then has the coordinates for node 201 and sends the ICMP reply (box 214) which is relayed by node 202 (box 215) to node 201 and the ICMP communication procedure is finalized.

The above described communication method has been illustrated by an ICMP echo request but it should be appreciated by the person skilled in the art any type of communication procedure, protocol, or scheme may be used. Also, the person skilled in the art should understand that more than three nodes may be involved in the communication network and transaction of traffic.

The above mentioned messages are not all part of the standard ARP procedure. However, even the non standard messages may be incorporated into a standard message by using the operation code (op) field. In this manner routing elements conforming to standard ARP requests will be able to handle ARP request made by routing elements using the proposed new ARP forwarding scheme. Standard routing element will only ignore such new ARP message types. Modified routing elements enabled to handle the new ARP forwarding scheme will be able to make use of the new codes included in the op field. The op field defines what type of message is transmitted or received. Therefore it is not necessary to change the ARP standard in order to implement the ARP forwarding scheme. The normal message types used in the op field in the address resolution protocol include ARP request, ARP reply, RARP request, and RARP reply. New message types proposed include, ARP forward, ARP error, and ARP link quality. As an example, in Table 1 below three different ARP message types and their respective content and transportation header in an Ethernet message system are shown. Table 1.A shows a standard ARP request message, Table 1.B shows an ARP reply message according to the non-limiting aspect, and Table 1.C shows an ARP forward message according to the non-limiting aspect. The actual information contained in the message is found on the right hand side of the tables in Table 1.A-C and in the fields Type, Hardware type, Protocol type, and Operation code both the descriptive term and the actual sent hexadecimal code (in parenthesis) is shown:

TABLE 1

A. ARP Request

Ethernet Header

| | |
|---|---|
| Destination: | FF:FF:FF:FF:FF:FF |
| Source: | 00:0D:56:3C:DE:C0 |
| Type: | ARP (0x0806) |

Address Resolution Protocol

| | |
|---|---|
| Hardware type: | Ethernet (0x0001) |
| Protocol type: | IP (0x0800) |
| Hardware address length: | 6 |
| Protocol address length: | 4 |
| Operation code: | Request (0x0001) |
| Sender hardware address: | 00:0D:56:3C:DE:C0 |
| Sender IP address: | 192.168.0.1 |
| Recipient hardware address: | 00:00:00:00:00:00 |
| Recipient IP address: | 192.168.0.3 |

B. ARP Reply

Ethernet Header

| | |
|---|---|
| Destination: | 00:0D:56:3C:DB:9D |
| Source: | 00:0D:56:3C:E2:4C |
| Type: | ARP (0x0806) |

TABLE 1-continued

Address Resolution Protocol

| | |
|---|---|
| Hardware type: | Ethernet (0x0001) |
| Protocol type: | IP (0x0800) |
| Hardware address length: | 6 |
| Protocol address length: | 4 |
| Operation code: | Reply (0x0002) |
| Sender hardware address: | 00:0D:56:3C:E2:4C |
| Sender IP address: | 192.168.0.3 |
| Recipient hardware address: | 00:0D:56:3C:DB:9D |
| Recipient IP address: | 192.168.0.2 |

C. ARP Forward

Ethernet Header

| | |
|---|---|
| Destination: | 00:0D:56:3C:DE:C0 |
| Source: | 00:0D:56:3C:DB:9D |
| Type: | ARP (0x0806) |

Address Resolution Protocol

| | |
|---|---|
| Hardware type: | Ethernet (0x0001) |
| Protocol type: | IP (0x0800) |
| Hardware address length: | 6 |
| Protocol address length: | 4 |
| Operation code: | Forward (0x000c) |
| Sender hardware address: | 00:0D:56:3C:DB:9D |
| Sender IP address: | 192.168.0.2 |
| Recipient hardware address: | 00:0D:56:3C:E2:4C |
| Recipient IP address: | 192.168.0.3 |

The new types of ARP message types will now be described:

ARP Forward: If this type is included in the op field of an ARP message any routing device with an implementation as described understands that this message is an ARP forward message and treats it as an ARP reply with some differences in message handling. It is also a function in the implementation of the ARP forwarding scheme introduced in the present non-limiting aspect. This function relay routes to nodes. The message contains the final destination and who the nearest hop to the final destination is.

ARP error is generated when a node realizes that it can not communicate with a certain node. This is generated if the node is unable to find any alternative routes to the certain sought after node. The ARP error message is broadcasted (to adjacent nodes, i.e. single-hop neighbors) and contains information about which node generated the error message and the node that can not be reached. The ARP error generating node removes all entries to routes containing the missing node and all routes where the missing node acts as a gateway. Receivers of the ARP error message broadcasted removes any active routes containing the missing node. If no alternative routes exist in the receiving node an ARP error message is generated and broadcasted.

ARP link quality message contains information about the link quality between two nodes.

It should also be considered that messages rebroadcasted by intermediary nodes are also received by previous nodes in the communication chain. In the example of FIG. 2, when node 202 rebroadcast an ARP request node 201 will receive the same message. In order to reduce the amount of control traffic every node may keep track of every request and reply by locally storing a pending list at every node. By looking in this list of recent requests and replies before forwarding an ARP request, a node may be able to reduce the amount of control traffic broadcasted on the network infrastructure. If a message received is determined to be concerning a node set already in the pending list, it will be discarded. In the pending list, information about which node is asking for which node, at what time this request was done, if any reply has been received, and if a reply has been forwarded to another node are stored.

In the solution it is also possible to introduce a time limit on how quick a node may rebroadcast a request destined for a specific node. When a request travels two or more different paths and is received at a node it should not be forwarded more than one time. This is solved by not allowing a node to forward a request to a specific node within a certain time limit. Vice versa, ARP replies or forward messages are only allowed to be sent once to every origin as long as no rebroadcast has been sent.

Since the ARP standard is not changed, no special ARP initiation routines is necessary. However, in another non-limiting embodiment a link quality supervision system may be introduced together with the above mentioned ARP solution in order to further reduce the amount of control traffic and increasing the traffic speed. By measuring the link quality between nodes, for instance the radio quality, acknowledgement information, bit error rate, or data rate throughput (from for example Transmission Control Protocol, TCP), it is possible to upon a detected link quality reduction, pro-actively update ARP listings. Such a scheme may reduce the amount of lost data packets and reduces the amount of control traffic in the infrastructure. In PCT/SE03/002074 (incorporated herein through reference) a similar scheme for link quality surveillance in an ad hoc network is introduced and incorporated herein by reference. The same system may be used for deciding when to update the ARP table.

Controllable parameters in the proposed ARP implementation include, but is mot limited to, how often a node may send ARP requests, how long time an entry in the pending list is valid and the amount of time a routing entry not in use stored in the ARP routing table is allowed to remain in the ARP routing table.

Requests are stored in a receiving node in such a way that the receiving node can send a reply to a requesting node if a reply is received from other nodes.

A node may be any computational device including, but not limited to, a laptop, personal digital assistant (PDA), embedded computer, or mobile phone. Such a device include at least one wireless transceiver and an instruction set memory with programming code handling address resolution protocol instructions and address resolution protocol forwarding and rebroadcasting instructions. The device also includes means in the instruction set memory for determining the final destination of messages and means for modifying ARP messages according to the present invention.

Figure 4:
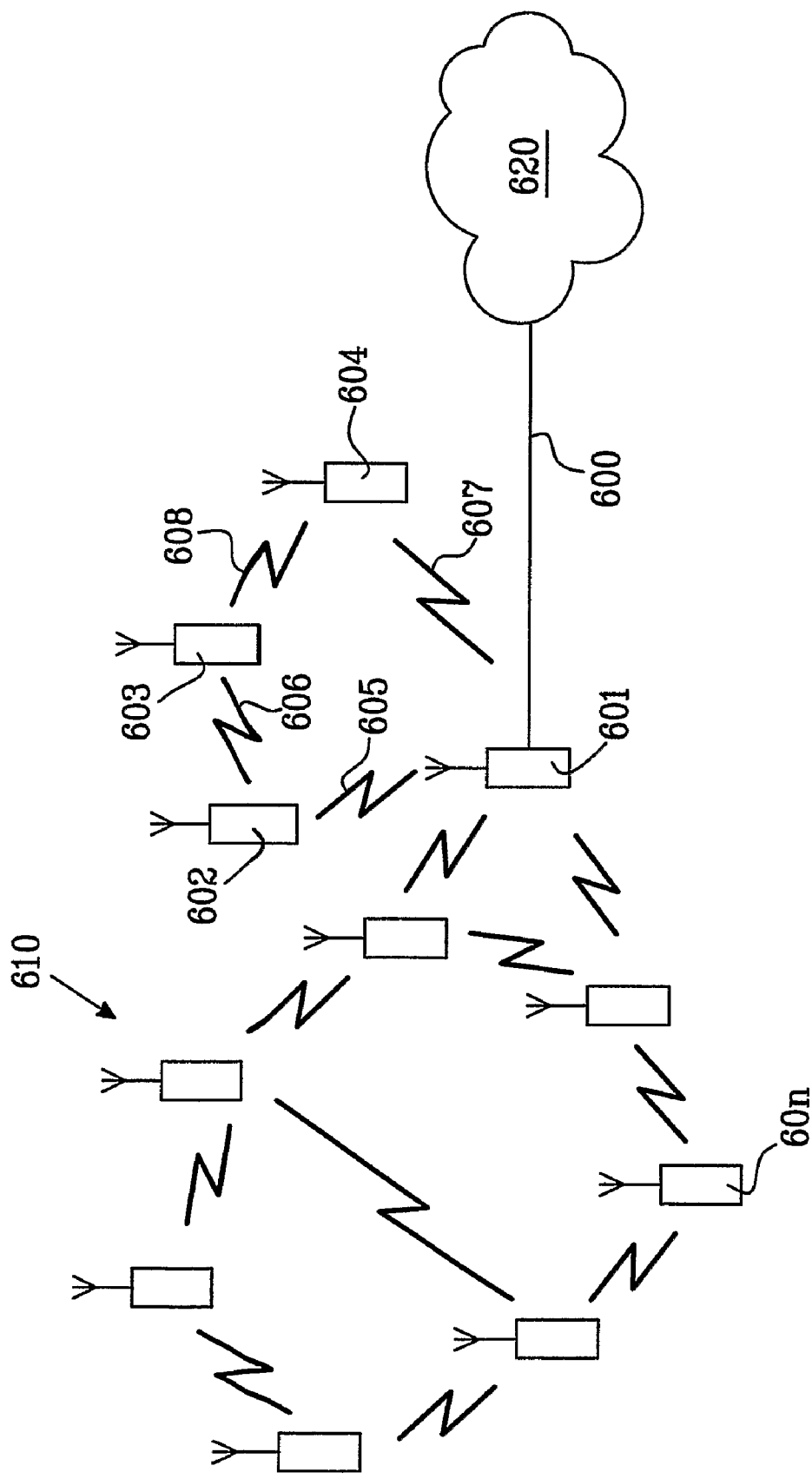
FIG. 4 illustrates a schematic of a larger multihop wireless network in connection with a fixed network.

The proposal may be used both for independent networks where no external connection is provided, such as in for instance a disaster area network setup or military network setup on the battlefield, and for a cluster of wireless components connected together and in the cluster there are at least one connection to an external network (e.g. Internet or an independent IP network). The latter embodiment is illustrated in FIG. 4 wherein a plurality of wireless components 602 . . . 60*n* (wherein n is an integer) are connected to a gateway 607 with a connection to an external network, for instance Internet. The external connection 600 may be of any type, including but not limited to, fixed wired connection (e.g. Ethernet, optical fiber, or similar), or fixed wireless (e.g. LMDS).

The communication scheme is independent of the radio-coding scheme used and any radio type may be used. For example, radio standards as of in the IEEE 802.11 series (e.g. IEEE 802.11a, IEEE 802.1b, IEEE 802.11g and so on), IEEE 802.15, IEEE 802.16, HiperLAN, HomeRF, Bluetooth, IR (Infrared), UWB (Ultra WideBand), JTRS (Joint Tactical Radio System), 3G (Third Generation mobile communication), GPRS (General Packet Radio Service), or EDGE (Enhanced Data rate for Global Evolution). However the possible radio standards are not limited to the above mentioned. It may be any suitable electromagnetic radiation based transmission scheme operating within the frequency band of 100 kHz to 100 PHz; this includes radio frequencies, microwave frequencies, and frequencies in the infrared, visible, and ultraviolet regimes.

The proposed ARP method may be used in many different application areas such as, for example, by the police in general or during special events, rescue forces during a disaster or an accident, military forces on the battlefield or in training, or for building wireless access areas for communication purposes both for residential and commercial network access. For example it is possible to use these ad hoc networks to build up broadband access using short range, low cost, wireless equipment in residential areas where other broadband access technology is scarce or too expensive to connect to. It may also be used in commercial districts for either providing broadband access to enterprises or small companies, or for wireless connections at so called hotspots. Hotspots are characterized in that they provide communication access within a certain area, for example at an airport lounge or in hotels, for paying customers or for free depending on business model.

Even though in the examples above three or four nodes have been used for illustration purposes, it should be appreciated by the person skilled in the art that more or less number of nodes may be used in such a network installation. There is no special limit on the number of nodes involved.

Although the invention has been described in detail for the purpose of illustration, it is to be understood that such detail is solely for that purpose and that variations can be made therein by those skilled in the art without departing from the spirit and scope of the invention except as it may be limited by the following claims.

The invention claimed is:

1. A method for "address resolution mapping" in a wireless multihop data communication network, the method comprising:

a first network node broadcasting an address resolution protocol (ARP) request to a second node, said ARP request being an ARP message in which an operation code field of said ARP message indicates that said ARP message is said ARP request;

said second node receiving said ARP request and determining a destination of said ARP request;

said second node transmitting said ARP request when said ARP request is determined to be destined to a third node; and said second node receiving an ARP reply from said third node, said ARP reply being an ARP message in which an operation code field of said ARP message indicates that said ARP message is said ARP reply;

said second node modifying said operation code field part of said ARP reply to indicate that said modified ARP reply is an ARP forward; and said second node forwarding said ARP forward to said first network node.

2. The method according to claim 1, wherein said second node comprises a plurality of nodes.

3. The method according to claim 1, further comprising storing a pending list of detected previous ARP requests and ARP forwards in said nodes.

4. The method according to claim 3, further comprising setting a time limit to storage time in the pending list of the stored previous ARP requests or forwards.

5. The method according to claim 1, further comprising setting a rate limit of ARP forwards in which a node is allowed to send to a specific destination.

6. The method according to claim 1, further comprising measuring link quality between nodes and distributing link quality information to nodes during ARP message procedures.

7. The method according to claim 6, wherein said link quality information comprises at least one of acknowledgement information, radio link quality, data rate throughput, and bit-error rate.

8. The method according to claim 6, further comprising using said link quality information to determine when said ARP table should be updated.

9. The method according to claim 6, further comprising comparing said link quality information with a threshold value in order to determine if an update is to be done.

10. The method according to claim 1, wherein an ARP error message is generated and distributed to listening nodes in the network when a node can not communicate with a certain node.

11. The method according to claim 1, further comprising said second node modifying said ARP request prior to rebroadcasting or forwarding said ARP request.

12. A communication device with routing means in a multihop wireless network, said device comprising:
an instruction set memory;
at least one wireless transceiver;
means for providing address resolution protocol (ARP) instructions in said instruction set memory;
means for modifying an operation code field part of an ARP message; and
means for providing ARP message forwarding and rebroadcasting instructions using a message type code indicating forward of the ARP message in the operation code field of the ARP message in said instruction set memory,
wherein when said operation code field of the ARP message indicates that said ARP message is an ARP reply, said means modifying modifies said operation code field of said ARP message to indicate that said modified ARP message is an ARP forward, and said means for providing ARP forwarding forwards said modified ARP message.

13. The device according to claim 12, wherein said means for ARP forwarding and broadcasting include means for determining the destination of the ARP message.

14. The device according to claim 12, wherein the communication device is a client system.

15. The device according to claim 14, wherein said client system is one of a laptop, personal computer (PC), personal digital assistant (PDA), mobile phone, or embedded computer.

16. The device according to claim 12, wherein the communication device is a part of an infrastructure system.

17. The device according to claim 16, wherein said infrastructure system comprises one or more of WLAN (Wireless Local Area Network) infrastructure devices, and mobile phone infrastructure devices.

18. The device according to claim 12, wherein said means for ARP forwarding or rebroadcasting instructions modify said ARP message to appear to originate from the device.

19. A system for multihop wireless data communication, said system comprising:
a plurality of communication devices arranged to build up a communication network,
wherein each of said communication devices comprises:
an instruction set memory;
at least one wireless transceiver;
means for providing address resolution protocol (ARP) instructions in said instruction set memory;
means for modifying an operation code field part of an ARP message; and
means for providing ARP forwarding and rebroadcasting instructions using a message type code indicating forward of ARP message in the operation code field of the ARP message in said instruction set memory,
wherein when said operation code field of the ARP message indicates that said ARP message is an ARP reply, said means for modifying modifies said operation code field of said ARP message to indicate that said modified ARP message is an ARP forward, and said means for providing ARP forwarding forwards said modified ARP message.

20. The system according to claim 19 said communication device further comprises means for determining the destination of said ARP message.

21. The system according to claim 19, wherein said communication device is a client system.

22. The system according to claim 21, wherein said client system is one of a laptop, personal computer (PC), personal digital assistant (PDA), mobile phone, or embedded computer.

23. The system according to claim 19, wherein said communication device is a part of an infrastructure system.

24. The system according to claim 23, wherein said infrastructure system comprises one or more of WLAN (Wireless Local Area Network) infrastructure devices, and mobile phone infrastructure devices.

25. The system according to claim 19, further comprising at least one gateway connected to an external network.

26. An instruction set memory storing therein an instruction set readable by one or more wireless node devices for "address resolution mapping" in a wireless multihop data communication network, the instruction set causing said one or more wireless node devices to perform:
a first network node broadcasting an address resolution protocol (ARP) request to a second node, said ARP request being an ARP message in which an operation code field of said ARP message indicates that said ARP message is said ARP request;
said second node receiving said ARP request and determining a destination of said ARP request;
said second node transmitting said ARP request when said ARP request is determined to be destined to a third node; and
said second node receiving an ARP reply from said third node, said ARP reply being another ARP message in which an operation code field of said another ARP message indicates that said another ARP message is said ARP reply;
said second node modifying said operation code field art of said ARP reply to indicate that said modified ARP reply is an ARP forward; and
said second node forwarding said ARP forward to said first network node.

27. A method of operating a node in a wireless multihop communication network for address resolution mapping, the method comprising:

said node receiving an address resolution protocol (ARP) message from a neighbor node;

said node examining an operation code of said ARP message;

when said operation code indicates that said ARP message is an ARP request message and said node is not a destination of said ARP request message, said node rebroadcasting said ARP message to one or more other neighbor nodes; and when said operation code indicates that said ARP message is an ARP reply message and said node is not a destination of said ARP reply message, said node forwarding said ARP message towards said destination of said ARP reply message, wherein said step of forwarding said ARP message comprises:

said node modifying said operation code of said ARP message to indicate that said ARP message is an ARP forward message; and said node forwarding said ARP forward message to a receiving node in a direction toward said destination.

28. The method according to claim 27, wherein said receiving node is a neighbor node from whom a corresponding ARP reply was previously received.

29. The method according to claim 27, wherein said step of forwarding said ARP message further comprises modifying said ARP reply message so as to notify said receiving node that said node can be used as a gateway to reach a node that originated said ARP Reply message.

30. The method according to claim 27, wherein said step of rebroadcasting said ARP message comprises:

said node altering said ARP message to appear as if said ARP request message comes from said node; and said node broadcasting said altered ARP request message to said to one or more other neighbor nodes.

* * * * *

UNITED STATES PATENT AND TRADEMARK OFFICE
CERTIFICATE OF CORRECTION

| | | |
|---|---|---|
| PATENT NO. | : 7,660,287 B2 | Page 1 of 1 |
| APPLICATION NO. | : 11/547604 | |
| DATED | : February 9, 2010 | |
| INVENTOR(S) | : Axelsson et al. | |

It is certified that error appears in the above-identified patent and that said Letters Patent is hereby corrected as shown below:

In Column 1, Line 14, delete "specialty" and insert -- specially --, therefor.

In Column 5, Line 14, delete "address"," and insert -- address". --, therefor.

In Column 7, Line 27, after "from" delete "a".

In Column 9, Line 11, after "art" insert -- that --.

In Column 11, Line 32, delete "mot" and insert -- not --, therefor.

In Column 13, Line 44, in Claim 12, after "means" insert -- for --.

In Column 14, Line 23, in Claim 20, delete "claim 19" and insert -- claim 19, wherein --, therefor.

In Column 16, Line 10, in Claim 29, delete "Reply" and insert -- reply --, therefor.

Signed and Sealed this

Twenty-seventh Day of July, 2010

David J. Kappos
*Director of the United States Patent and Trademark Office*